United States Patent [19]
Evans et al.

[11] Patent Number: 5,331,674
[45] Date of Patent: Jul. 19, 1994

[54] NUCLEAR REACTOR COOLANT SYSTEM INVENTORY CONTROL SYSTEM AND METHOD

[75] Inventors: Cliff Evans, Newtown; Jagdish H. Shah, Cheshire, both of Conn.

[73] Assignee: Rust Industrial Services, Inc., Westchester, Ill.

[21] Appl. No.: 999,041

[22] Filed: Dec. 31, 1992

[51] Int. Cl.⁵ .............................................. G21C 13/00
[52] U.S. Cl. ...................................... 376/204; 376/260
[58] Field of Search ................................ 376/260, 204

[56] References Cited
U.S. PATENT DOCUMENTS

| | | | |
|---|---|---|---|
| 4,482,076 | 11/1984 | Wentzell | 220/232 |
| 4,671,326 | 6/1987 | Wilhelm et al. | 376/204 |
| 4,690,172 | 9/1987 | Everett | 376/204 |
| 4,957,215 | 9/1990 | Evans et al. | 376/204 |
| 4,959,192 | 9/1990 | Trundle et al. | 376/204 |

Primary Examiner—Donald P. Walsh
Assistant Examiner—Frederick H. Voss
Attorney, Agent, or Firm—Robert A. Seemann

[57] ABSTRACT

A nozzle dam has a valve controlled passage through the nozzle dam wall for releasing trapped gas from the nozzle in the region below the nozzle dam. The gas is released while the reactor coolant system water general level is above the level of the nozzle dam.

12 Claims, 3 Drawing Sheets

NUCLEAR REACTOR COOLANT SYSTEM INVENTORY CONTROL SYSTEM AND METHOD

BACKGROUND OF THE INVENTION

1. Field of the Invention

This invention is concerned with nuclear reactor damage prevention, more particularly with preventing occurrence of a coolant void at the top of the nuclear fuel assembly from sudden loss of reactor coolant system (RCS) inventory level caused by nozzle dam removal at the completion of a maintenance cycle.

2. Description of the Prior Art

There exists the possibility of a sudden, uncontrolled, substantial drop in reactor coolant system inventory level when a nozzle dam is removed, more specifically at the moment when the seal between the nozzle dam and the nozzle is broken, after the nozzle dam has been in place for sufficient time to perform an average maintenance cycle of several weeks or longer.

If the drop is severe enough, the water will fall below the level of the reactor hot side opening to the residual heat removal system (RHR), starving the system and stalling the RHR pump. This can result in overheating and water not reaching the exposed top of the core. This is a potentially hazardous condition which must be prevented.

A phenomena that is likely to be associated with this potential condition is an uncontrolled upward bounding of the nozzle dam, which can be hazardous to personnel unbolting the dam from the nozzle. This also must be prevented.

Indications of the phenomena and lowered RCS inventory level were observed for example at the following instances, when nozzle dams were being removed after the usual industry procedure of lowering the water level to mid loop from being at the refueling level for some extended period. The following data is based on recollections by the technicians and on-site management personnel. No coordinated data collection, however, was made at the time to specifically record changes in RCS inventory levels during nozzle dam removal.

In the summer of 1990, and spring of 1991, at the Catawba plant, Unit 2, 4-loop system with common drain on steam generator. The cold leg dam bounded. Although one of the incidents was recorded on video tape, the RCS inventory levels were not recorded.

In the Spring of 1992, at the Callaway plant, 4-loop system, common drain on steam generator. The dams bounded in the 4th and 8th cold legs. The control room reported a substantial drop in the Reactor coolant system inventory level after removal of the 4th and 8th cold legs.

In the Fall of 1992, at Diablo Canyon plant 4-loop, individual drain on steam generator system, a cold leg dam bounded.

In present industry practice, after primary water is drained below the steam generator bowl, down to mid loop, and before it is restored to refueling level above the steam generator bowl, every precaution is taken to hermetically seal off the steam generator bowl from the hot and cold leg nozzles by a nozzle dam for each nozzle, and by a drain plug for each individual drain conduit between the bowl, also termed "channel head", and nozzle which bypasses the dam.

Once the water is restored to the refueling level, leakage may occur around the seal of some nozzle dams. The typical procedure, as described in U.S. Pat. No. 4,959,192, Trundle et al, patented Sep. 25, 1990, is to monitor for leakage into the bowl, the leakage being acceptable provided a bowl drain pump can keep up with the leakage.

Many nozzle dams, especially including ones with inflated seals such as the BUSI Nozzle Dam, available from Brand Utility Services Inc., and generally described in U.S. Pat. No. 4,957,215, Evans et al., patented Sep. 18, 1990, are designed to have no leakage across the seal barrier between the nozzle and the bowl interior once the dam is bolted in place. Having a combination of passive and inflated seals, the BUSI Nozzle Dam usually seals against cross leakage even without the inflatable seals being inflated.

Inflatable seals are also described, for example, in U.S. Pat. No. 4,482,076, Wentzell, patented Nov. 13, 1984, and in U.S. Pat. No. 4,690,172, Everett, patented Sep. 1, 1987.

In removing a nozzle dam, it is standard in the industry, as described in U.S. Pat. No. 4,959,192, Trundle, to remove the nozzle dam after the reactor coolant system has been drained to mid loop. Trundle suggests that it is preferable to remove the hot leg dam prior to the cold leg dam. He also suggests that in a system having an individual drain conduit to remove the drain plug after draining down below the nozzle dam in order to confirm that the loop is adequately drained, that is, drained below the level of the nozzle as indicated by an absence of water leaking up from the drain conduit, before removing the nozzle.

He also suggests to allow several minutes to elapse between removal of the drain plug after the water level is drained below the nozzle dam and attempting removal of the nozzle dam when working in the cold leg, in order to allow any low pressure caused by draining the loop to dissipate.

Although the above steps and precautions which are characteristic in the field are useful and continue to be advisable in installing and removing a nozzle dam and drain plug, they do not prevent chance of the aforedescribed bounding or of an uncontrolled drop in reactor coolant system, and may bring on the conditions leading to the occurrences.

The present invention is designed to prevent the above described phenomena of nozzle dam bounding and sudden excessive drop in reactor coolant system inventory level when a nozzle dam is removed from the nozzle.

SUMMARY OF THE INVENTION

A nozzle dam has a passage comprising a hole through a wall of the dam which hermetically seals the nozzle of a water cooled nuclear reactor primary coolant system steam generator bowl nozzle. The passage is provided for releasing gas from the nozzle in the region below the nozzle dam, through the dam, to the bowl when the nozzle dam is mounted sealingly in the nozzle.

A valve, connected by pipe means such as hose or connected by direct attachment means to the hole, provides for control of fluids through the passage. Pipe means such as a hose attached to the valve is positioned for directing the fluids out of the bowl.

After the reactor coolant system water general level is raised to a level that is higher than the nozzle dam, and before completion of a later step of lowering the water level to a level that is below the nozzle dam, before the water is taken below the nozzle dam, a passage is opened exiting the nozzle for release of trapped gas through the passage from the nozzle from the region immediately below the nozzle dam. Preferably the passage is through the nozzle dam wall. It may, however, be through a wall of the bowl.

BRIEF DESCRIPTION OF THE DRAWINGS

In order that the invention be more fully comprehended, it will now be described, by way of example, with reference to the accompanying drawings, in which.

DESCRIPTION OF THE PREFERRED EMBODIMENTS

Figure 1:
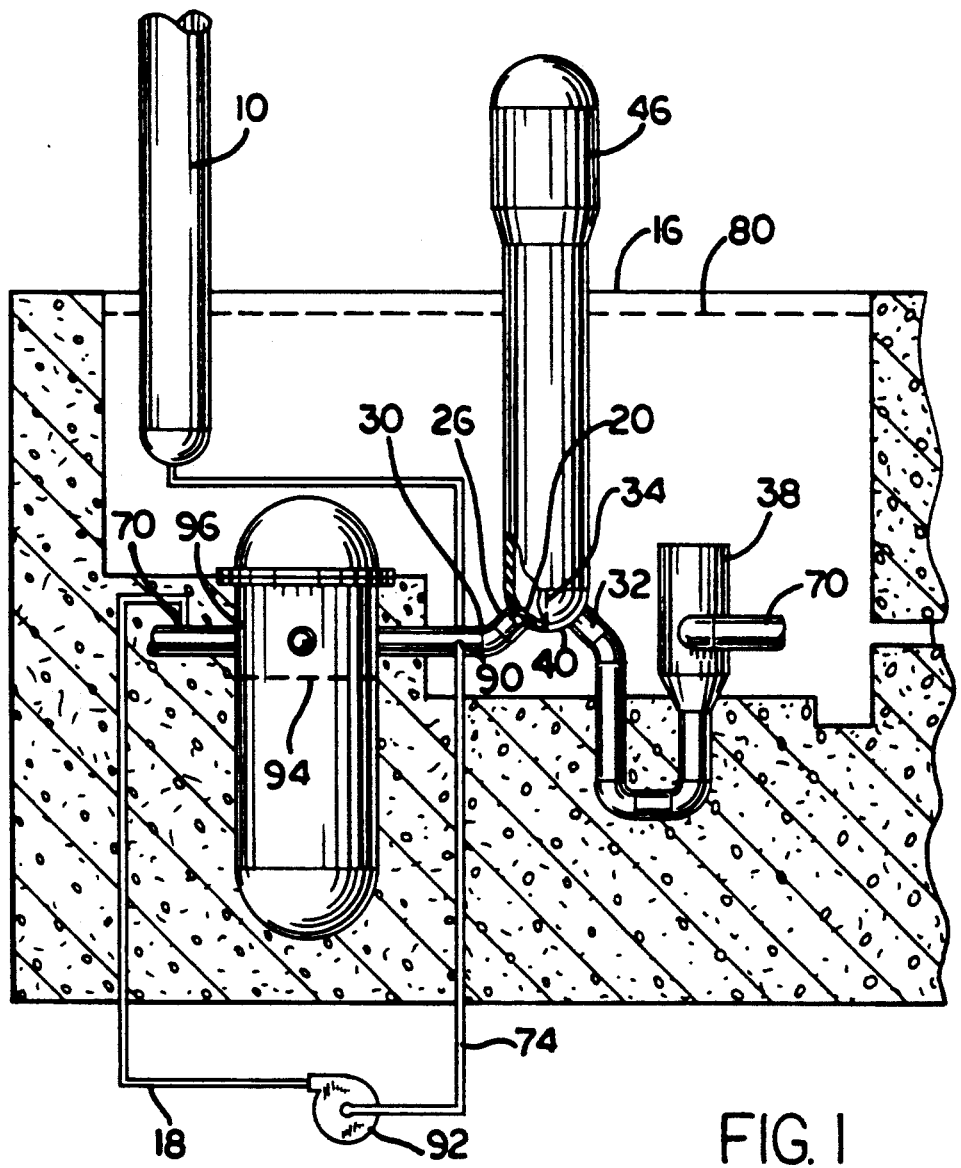
FIG. 1 is a schematic view of a typical water cooled reactor, steam generator system, showing various water levels during refueling.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

In order to enable the reader to better understand the following description of the invention, the following list provides typical water and system component elevations for a water cooled reactor and steam generator shown in FIG. 1. Values not pertinent to the explanation of the present invention are denoted not applicable, "N/A".

| Component | drawing designator | feet elevation |
|---|---|---|
| refuel deck | 16 | 2047.5 N/A |
| mid loop level | 70 | 2014.5 |
| residual heat removal system RHR suction line | 90 | 2013.7 |
| top of fuel | 94 | 2010.3 |
| RHR discharge | 18 | 1971.8 N/A |
| to reactor (mid loop level) | 70 | 2014.5 |
| nozzle dam | 20 | 2017 |
| RHR loop | 74 | — |
| refueling level | 80 | 2044.6 |
| pressurizer | 10 | N/A |
| steam generator | 46 | — |
| reactor | 96 | — |
| reactor coolant pump, RCP | 38 | N/A |
| RHR pump | 92 | — |

Figure 2:
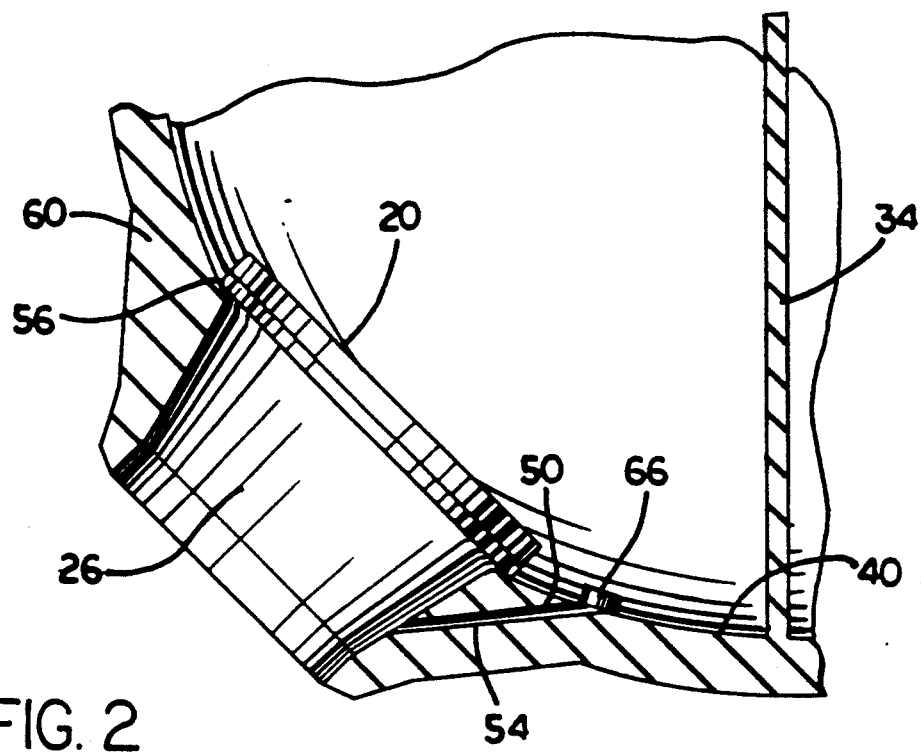
FIG. 2 is a cross section schematic view of a nozzle dam in place over a nozzle in a steam generator bowl.

Referring to FIGS. 1 and 2, nozzle dam 20 is installed over nozzle 26 of hot leg 30 of the hot side off partition 34 of bowl 40 of steam generator 46.

Bowl drain 50 includes passage 54 which connects nozzle 26 with bowl 40, bypassing the hermetic seal 56 that is provided by the nozzle dam when in intimate contact with the nozzle wall 60. Drain 50 is sealed by screw-in plug 66.

After the reactor coolant system "RCS" inventory water general level is lowered to mid loop level 70 of the residual heat removal system "RHR" loop 74 and of the hot and cold primary coolant inlet 30 and outlet 32 legs respectively of the steam generator bowl, nozzle dams are installed in the hot leg and cold leg nozzles, and plugs are installed in the individual bowl drains.

After all nozzle dams are installed, the RCS inventory level is raised to refueling level 80 which causes a pressure head of about 27 feet of water (11.7 psig) directed upward against nozzle dam 20, and a pressure head of 43.5 feet (18.9 psig) at the lowest elevation of the cold leg, assuming that lowest elevation to be about 14 feet below mid loop in most plants.

Figure 3:
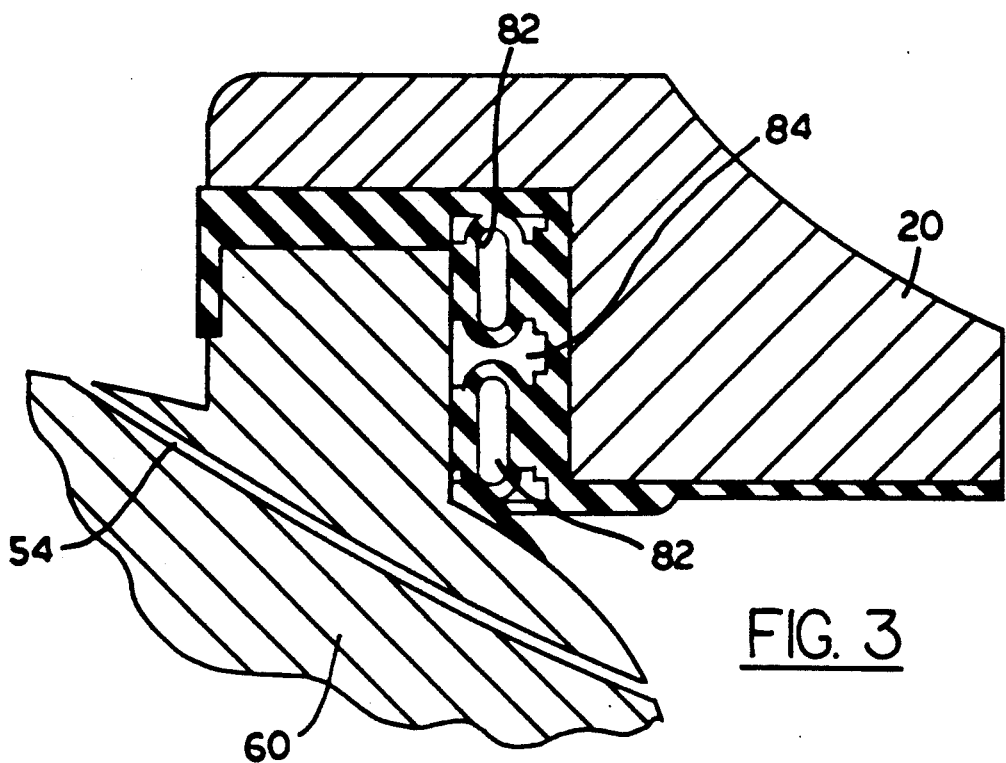
FIG. 3 is a cross section view of an inflatable nozzle dam seal in sealing contact with a nozzle wall.

Referring additionally to FIG. 3, the nozzle dam inflatable seals 82 are each maintained at approximately 65 psig. Annulus 84 between the inflatable seals is maintained at 5 psig and monitored in order to learn of leakage in the seal system. Slow increase has been widely observed in annulus pressure. This may indicate that a very small amount of air can escape from the inflatable seals either by osmosis or from minute leaks. It is now believed by the present inventors that this air can also leak to the nozzle side of the seal.

Pressurized seals presently seem to be the most efficient and safest way to seal a nuclear reactor steam generator nozzle. It is also now believed by the inventors that prolonged installation of a nozzle dam having an inflatable seal could allow enough osmotic or small leakage of air from the 65 psig source to displace the 11.7 to 18.9 psig water occupying the volume of the cold leg below the cold leg nozzle elevation. After having displaced the water, continuing air bubbles out toward RCS inventory storage.

The nozzle dams remain in place while maintenance is completed on the reactor system, sometimes for as long as 30 days, then the water level is dropped from refueling level 80 to mid loop 70 in order to remove the nozzle dams. This reduces the pressure on the trapped column of air in the cold leg to a head of 14 ft. The trapped air exerts a pressure of approximately 6.1 psig totaling 7,662 pounds against the underside of the 40" diameter nozzle dam.

Under this pressure, upward bounding can occur, driven by the trapped air as soon as a movable portion of a nozzle dam is unbolted.

In a nozzle dam system relying solely upon inflatable seals, rather a combination passive and active inflatable system as in the BUSI Nozzle Dam, the trapped air is released around the dam when the seals are deflated, and bounding does not occur. Nevertheless loss of RCS inventory level can still occur.

For steam generators with individual drain lines, bounding can be reduced by removing the drain plug after the reactor coolant system water general level is moved to mid loop level, and waiting for some period of time before removing the nozzle dam. Nevertheless loss of RCS inventory level can still occur.

In steam generators with a common drain instead of individual drain lines, there is no access to the nozzle region just below the nozzle dam.

The cause for loss of RCS inventory level is considered to be as follows. The volume of the trapped air is conservatively calculated to be 15.75 inches radius squared (or 248.06 square inches), times 3.14 (Pi), divided by 144, times 16.5 feet vertical height=89.25 cu.

ft. or 669 gallons. When the cold leg nozzle dam is removed, the trapped air escapes and water rushes upward to equalize the reactor coolant system water general level, the RCS inventory could suddenly decrease by 669 gallons. Assuming 1191 gallons per vertical foot of RCS inventory, this event could result in a sudden decrease in RCS inventory level by about 7.2 inches.

The residual heat removal system RHR suction line 90 is only 9.6 inches below mid loop 70. Taking in the above conservative calculation plus bends in cold legs, increase in volume near nozzles and water sloshing effects, it is conceivable that a single occurrence of this event can cause the localized inventory level close to the RHR suction line to fall, causing a risk of vortexing-/cavitation failure of RHR pump, and subsequent loss of effectiveness of the RHR. Furthermore, unless RCS inventory is recovered after removal of the first cold leg dam of a system, further substantial risk exists when a second cold leg dam is removed, assuming that the second cold leg nozzle dam experiences a similar occurrence.

If four cold legs in a system experience the same occurrence without water level recovery, the water level would drop to about 21 inches from the top 94 of the fuel in reactor 96.

In order to avoid the above problem associated with use of nozzle dams with inflatable seals, it is advisable to bleed the trapped air from the cold leg before the RCS inventory drain down process is completed, so that the water level in the cold leg seeks the RCS inventory water general level.

This process step can be accomplished preferably by passing the air from the nozzle leg into the bowl by way of a valve and passage through the nozzle dam. Another way is by passing the air from the nozzle leg into the bowl by way of a valve connected to passage 54 in place of the presently used plug.

Figure 4:
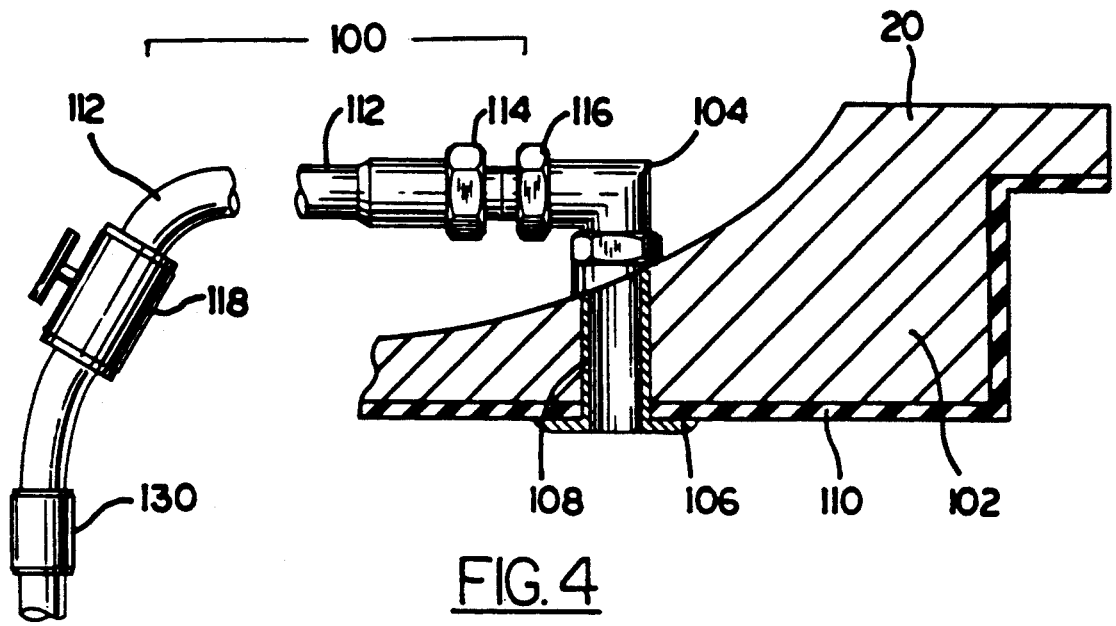
FIG. 4 is a partial cross section view of a valve controlled passage across the dam barrier between the bowl and the nozzle.

Referring to FIG. 4, valve assembly 100 passes through passage 108 of nozzle dam 20 body wall 102. If the nozzle dam is a BUSI Nozzle Dam, the valve is preferably mounted in the center section of the dam's three sections. Flared end 106 of fitting 104 sealingly engages rubber diaphragm 110 which spans the three sections. At the other end of fitting 104 is pipe means such as ¼ inch reinforced hose 112 securely attached to the fitting.

Adaptor 114 permits connection of hose 112 before the water level is to be lowered. Connector section 116 seals fitting 104 until hose 112 is attached for use of the fitting.

Control valve 118, connected to passage 108 by way of hose 112 and fitting 104 is preferably located outside the generator bowl so that it can be easily controlled by an operator. Water-stop gas-conducting valve 130 releases the trapped air which flows via passage 108 from the nozzle in the region immediately below the nozzle dam, remaining open until it encounters water which it blocks. This valve design may be taken from ones presently used to automatically bleed air from water circulator systems.

Figure 5:
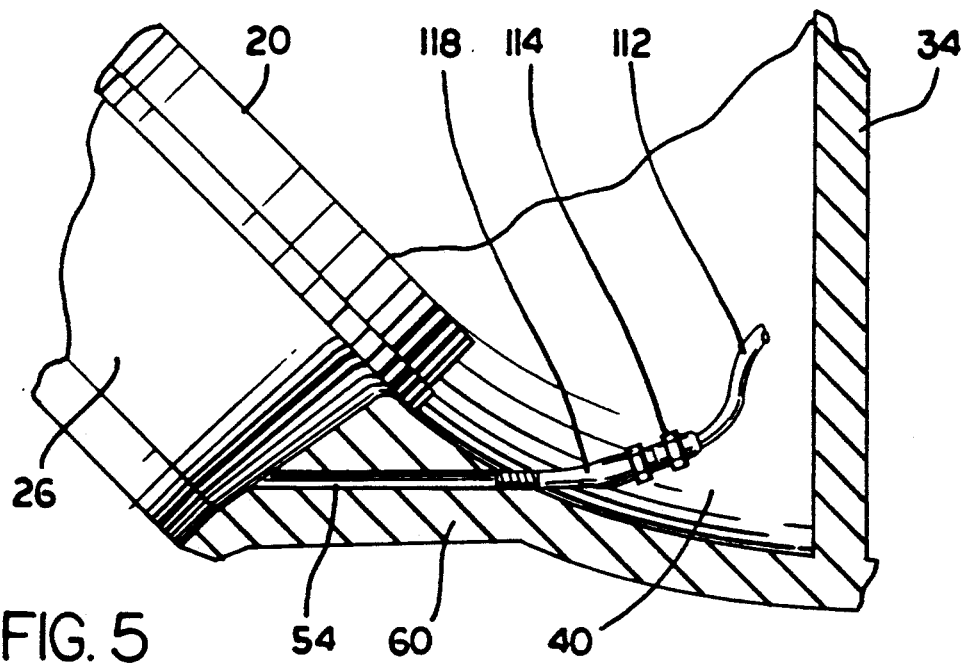
FIG. 5 is a partial cross section view of a valve controlled passage across the dam barrier between the bowl and the nozzle.

A valve assembly 118 similar to valve assembly 100 may be tapped into passage 54 by using a suitably modified fitting as shown in FIG. 5.

In operation, valve 18 is turned on or opened shortly before or during lowering of the water level toward the mid loop level, and air is permitted to flow from the pipe until water reaches the valve. It is then known that the compressed air is removed, and valve 118 is turned off or closed. Automatic valve 130 can perform the same function.

The hose is preferably positioned for directing the air out of the bowl. It may be for example passed out of the bowl through a manway, or connected to a bowl common drain.

The hose may also be extended to a height that is higher than the level of the RCS water general level at which the air bleed is taking place. Visual or sensor indication may then be had from the raised hose to determine when the hydrostatic level of the water under the dam is equal with that of the RCS water general level.

When the trapped air is removed, and the water general level is brought to mid-loop below the height of the nozzle dam, the dam may then be removed.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

What is claimed is:

1. In a nozzle dam for hermetically sealing against a wall of a nozzle of the steam generator bowl of a water cooled nuclear reactor primary coolant system against passage of fluids between said nozzle and said bowl, said nozzle dam comprising:
   passage means completely through said nozzle dam for releasing gas from the nozzle in the region below the nozzle dam, through the dam, to said bowl when said nozzle dam is mounted sealingly in said nozzle.

2. The nozzle dam described in claim 1, further comprising:
   said passage means comprising a hole through said dam, and
   said dam further comprising valve means connected to said hole for controlling flow of fluids through said hole in said dam.

3. The nozzle dam described in claim 2, further comprising
   pipe means connected to said valve means, said pipe means being positioned for directing said fluids out of said bowl.

4. In a water cooled nuclear reactor primary coolant system in which a nozzle dam is in place for hermetically sealing a nozzle of the steam generator bowl, a method for reducing the chance of uncontrolled drop of reactor coolant system inventory level below mid loop level when a hermetic seal between the nozzle and steam generator bowl is broken, said method comprising:
   after the reactor coolant system water general level is raised to a level that is higher than the nozzle dam, and
   before completion of a later step of lowering of the reactor coolant system water general level to bring it to a level that is below the nozzle dam wherein taking of the general level below the nozzle dam is not yet attained,
   the intermediate step of opening a passage exiting the nozzle for release of trapped gas through said passage from the nozzle from the region immediately below the nozzle dam.

5. The method described in claim 4, further comprising:

said intermediate step being carried out before said later step of lowering the reactor coolant system water general level is started.

6. The method described in claim 4, further comprising:
said passage for said release of said gas from said nozzle being through said nozzle dam.

7. The method described in claim 4 further comprising:
said passage for said release of said gas from said nozzle being through a wall of said bowl.

8. The method described in claim 5, further comprising:
said passage for said release of said gas from said nozzle being through said nozzle dam.

9. The method described in claim 5 further comprising said passage for said release of said gas from said nozzle being through a wall of said bowl.

10. The method described in claim 6 further comprising:
said opening of said passage being by opening a valve in a pipe line of said passage until gas flow ceases.

11. The method described in claim 7, further comprising:
said opening of said passage being by opening a valve in a pipe line of said passage until gas flow ceases.

12. In a water cooled nuclear reactor primary coolant system in which a nozzle dam is in place for hermetically sealing a nozzle of the steam generator bowl, a method for reducing the chance of uncontrolled drop of reactor coolant system inventory level below mid loop level when a hermetic seal between the nozzle and steam generator bowl is broken, said method comprising:
in preparation for removing said nozzle dam from said nozzle,
before completion of the step of lowering of the reactor coolant system water general level to bring it to a level that is below the nozzle dam, wherein taking of the general level below the nozzle dam is not yet attained,
the step of opening a passage exiting the nozzle for release of trapped gas from the nozzle in the region immediately below the nozzle dam, and keeping the passage open until the trapped gas is released and water in the nozzle rises to the dam.

* * * * *